United States Patent [19]

Welmers et al.

[11] Patent Number: 4,661,699
[45] Date of Patent: Apr. 28, 1987

[54] SCANNING BEAM CONTROL SYSTEM AND METHOD WITH BI-DIRECTIONAL REFERENCE SCALE

[75] Inventors: Thomas E. Welmers, Santa Monica; Theodore R. Whitney, Woodland Hills, both of Calif.

[73] Assignee: T. R. Whitney Corporation, Reseda, Calif.

[21] Appl. No.: 828,592

[22] Filed: Feb. 10, 1986

Related U.S. Application Data

[63] Continuation of Ser. No. 479,139, Mar. 28, 1983, abandoned.

[51] Int. Cl.⁴ .............................................. H01J 3/14
[52] U.S. Cl. .................................... 250/235; 358/293
[58] Field of Search ............... 250/201, 234, 235, 236, 250/237 G, 548, 557; 350/6.7; 358/293, 296

[56] References Cited

U.S. PATENT DOCUMENTS

| | | | |
|---|---|---|---|
| 3,573,849 | 4/1971 | Herriott et al. | 346/108 |
| 3,809,806 | 5/1974 | Walker et al. | 178/7.6 |
| 3,835,249 | 9/1974 | Dattilo et al. | 178/7.6 |
| 3,893,079 | 9/1970 | Shepard et al. | 340/146.3 F |
| 4,019,186 | 4/1977 | Dressen et al. | 346/108 |
| 4,178,064 | 12/1979 | Mrdjen | 350/6.6 |
| 4,206,348 | 6/1980 | Davey et al. | 250/201 |
| 4,212,018 | 7/1980 | Ohnishi et al. | 346/76 L |
| 4,279,472 | 7/1981 | Street | 250/201 |
| 4,293,202 | 10/1981 | Ohnishi et al. | 354/5 |
| 4,298,974 | 5/1979 | Tsunoda et al. | 369/45 |
| 4,306,242 | 12/1981 | Jeffery | 346/1.1 |
| 4,358,793 | 11/1982 | Hosaka et al. | 358/286 |
| 4,365,256 | 12/1982 | Byckling | 346/108 |
| 4,408,826 | 10/1983 | Ike | 350/6.8 |
| 4,441,126 | 4/1984 | Greenig et al. | 358/293 |

OTHER PUBLICATIONS

Gerald Toyen, "Generation of Precision Pixel Clock in Laser Printers and Scanners," SPIE, vol. 84, Laser Scanning Components and Techniques (1976), pp. 138–145.

*Primary Examiner*—David C. Nelms
*Assistant Examiner*—William L. Oen
*Attorney, Agent, or Firm*—Bogucki, Scherlacher, Mok & Roth

[57] ABSTRACT

Apparatus (10) for controlling a beam (12) of coherent light includes a reference scale (38, 138) provided with indicia forming a plurality of spokes having two sets of properties. The first of the two sets of properties is an evenly spaced first set of edges (41) arranged for generating a data clock exactly referenced to a position of a first of the two separate, perpendicular directions. A second set of edges (44) are each spaced variably from an associated one of the first set of edges (41) as a function of the other of the two separate, perpendicular directions, making the second of the two sets of properties a variable width of each of the spokes.

22 Claims, 3 Drawing Figures

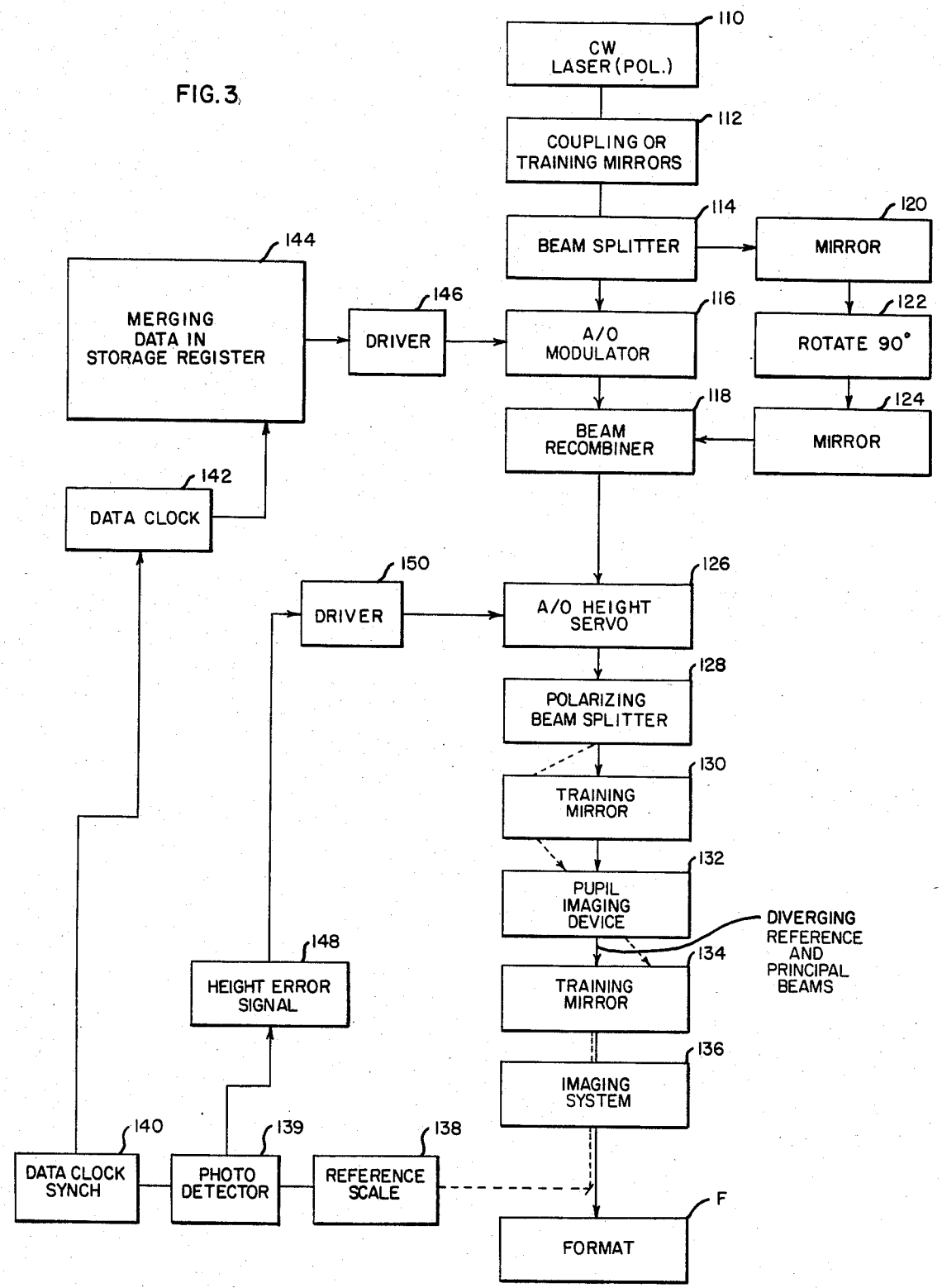

SCANNING BEAM CONTROL SYSTEM AND METHOD WITH BI-DIRECTIONAL REFERENCE SCALE

This is a continuation of co-pending application Ser. No. 479,139 filed on Mar. 28, 1983, now abandoned.

BACKGROUND OF THE INVENTION

1. Field of the Invention

This invention is directed generally to scanning systems which must precisely locate image picture elements (pixels) throughout a flat format during writing or reading operations. More particularly it relates to the positioning of image pixels in both X and Y directions on a format so as to correct height errors as well as spacing errors with a high order of precision compatible with extremely small spot size.

2. Description of the Prior Art

In high speed scanning systems such as precision plotters, printers, and the like, a number of problems are encountered in exactly locating image pixels throughout an object field format, particularly a flat format. The scanning beam, which is moved transversely across an object plane (here called the X direction) is equally of non-constant velocity and must traverse non-uniform path lengths. Errors can thus occur in the X direction due to optical distortion, scanner speed, projection of the scan onto a flat format, or simply because of vibration of the equipment. Discussion of such problems can be found in an article entitled "Generation of Precision Pixel Clock in Laser Printers and Scanners" by Gerald Toyen, published in SPIE, Volume 84, Laser Scanning Components and Techniques (1976), pp. 138-145.

In the aforementioned article by Toyen, it is proposed to split a laser beam prior to modulation and direct an auxiliary, unmodulated, beam in parallel with a main beam so as to be reflected off a polygon and through an optical grating which functions as a positional reference. Thus by synchronizing data to a pixel clock derived from the reference, one precisely locates pixels in the X-direction whether reading or writing, although the systems may otherwise be substantially different.

The aforementioned auxiliary beam clock does not, however, correct or eliminate height (Y-direction) errors on the format. These errors can occur due to scan inaccuracies such as non-parallelism of the faces of a scanning polygon, vibration, table drive errors, and the like. Since such errors affect the linearity as well as placement of a line of pixels, they determine the vertical resolution of the system, and should be minimized to a degree consistent with the system application. Mechanical and optical systems can only be made highly precise at inordinate expense, while at the same time modern scanning systems may use focused beams of the order of 15 $\mu$m in diameter and pixels each 0.0005". Systems of the prior art do not provide a basis for economically achieving such resolutions in both X and Y directions.

U.S. Pat. Nos. 4,306,242, issued Dec. 15, 1981 to E. A. Jeffery; 4,310,757, issued Jan. 12, 1982 to F. T. Check, Jr. et al; 4,311,384, issued Jan. 19, 1982 to W. H. Keene; and 4,311,385, issued Jan. 19, 1982 also to W. H. Keene; disclose additional examples of laser recording systems and the like, which employ an auxiliary or reference beam for clocking purposes. Another example of laser scanning apparatus having beam position means can be found in U.S. Pat. No. 4,279,472, issued July 21, 1981, to G. S. B. Street, while other examples of clocking arrangements for laser beam recording systems, and the like, can be found in U.S. Pat. Nos. 4,212,018, issued July 8, 1980 to M. Ohnishi et al; 3,389,403, issued June 18, 1968 to J. M. Cottingham; 4,285,012, issued Aug. 18, 1981 to Y. Ohara et al; 4,293,202, issued Oct. 6, 1981 to M. Ohnishi et al; and 4,307,409, issued Dec. 22, 1981 to N. L. Greenig et al. U.S. Pat. Nos. 4,274,703, issued June 23, 1981 to T. Fisli discloses an optical system which provides a flat scanning line, and 4,245,228, issued July 13, 1981 to G. F. Cook, discloses a laser plotter construction wherein a modulated light beam is deflected in order to scan a light sensitive medium transversely while sweeping a high resolution raster perpendicular to the scan direction in order to form points of intersection where data are to be located.

SUMMARY OF THE INVENTION

In accordance with the present invention, a scanning system incorporates a single reference pattern to provide highly precise positional references for the scanning beam in two directions. The apparatus may include means for scanning a modulated light beam, such as a rotatable polygon deflector arranged for deflecting the light beam through an optical system onto a flat object format, along at least one closely parallel but spaced apart reference beam. Prior to the scanning system, both the modulated principal beam and the reference beam pass through a beam height deflector device which is controllable by applied signals to deflect both beams in equal or proportionate amounts in the Y direction. Subsequent to the imaging optics and adjacent the flat field format the reference beam alone is deflected through a reference pattern disposed adjacent to the writing path for the principal beam. The reference pattern modulates the scanning reference beam to provide a pulse width modulated signal whose periodicity synchronizes a reference clock for the X-axis direction and whose pulse width controls the height deflector.

The reference beam system includes a beam splitter system for bypassing the modulator with a given proportion (generally minor) of the principal beam, but reestablishing both beams in parallelism, preferably collinearly, before entering the height deflector. The optical reference pattern includes a reference scale provided with regularly spaced indicia or spokes having selected geometries in two directions. An evenly spaced set of edges on one side generates leading edges providing a data clock referenced to beam position for the X-direction. Spoke width, however, which varies linearly as a function of Y over a given length, generates pulse widths defining a direction error signal, which in turn is fed back to eliminate height error by controlling the height deflector. The reference indicia are spaced at some fraction of the pixel rate and used to synchronize a higher speed clock, so that an extremely fine reference pattern need not be used. The height deflecting assembly can be a vertically deflecting acousto-optic deflector.

Further, a reference beam is advantageously generated by rotating the plane of polarization when bypassing the modulator. Thereafter, after controlled height adjustment, a polarizing beam splitter in the optical path directs the reference beam into a training mirror path so as to impart the desired small divergence between the reference and principal beams. Both beams pass into the optical system for scanning and focusing prior to subsequent separation of the reference beam just prior to the flat format.

An advantage of the present invention is that pixel lines can be precisely located in both X and Y directions on a flat format for either a plotter or scanner. Furthermore, straight lines can be scanned because the system compensates for a number of errors in a scanning optical system.

Another advantage of the present invention is that vertical or height correction or location of pixels can be achieved as a function of pixel clock synchronization.

BRIEF DESCRIPTION OF THE DRAWINGS

FIG. 3 is a flow chart showing a pixel location control apparatus according to the present invention.

DETAILED DESCRIPTION OF THE INVENTION

Figure 1:
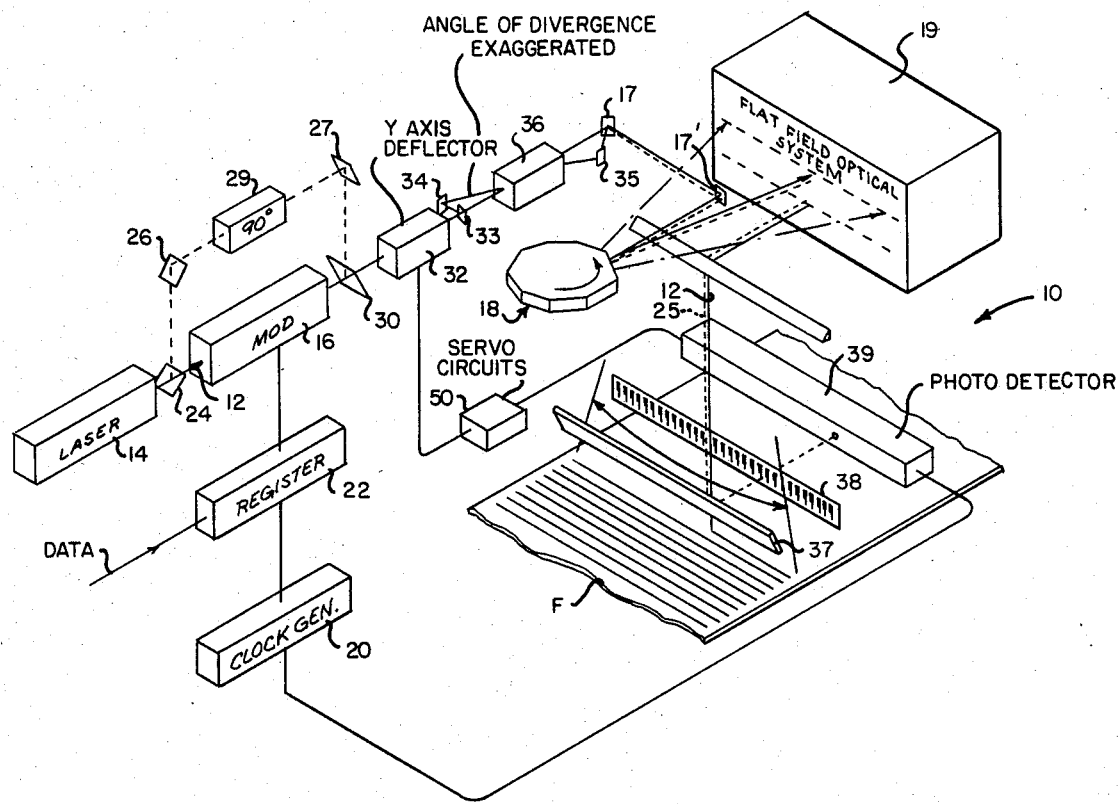
FIG. 1 is a diagrammatic, perspective representation of a plotting or scanning apparatus employing a reference scale and height deflecting system according to the present invention.

Referring now more particularly to FIG. 1 of the drawings, an apparatus 10 according to the present invention for precisely locating a scanning beam in two dimensions comprises a system for writing successive lines across a film F disposed on a flat object field or format. A concentrated light beam 12, such as a coherent laser beam from a monochromatic (in this example) laser 14, is directed through an acousto-optic modulator 16 and onto a rotating polygon scanner 18 for scanning in the X-direction (transversely across the film F along a predetermined scan line). The scanning beam preferably but not necessarily is passed through imaging optics in a flat field optical system 19 of which the polygon scanner 18 is a part, as described in a previously filed patent application entitled "Scanning Imaging System And Method" by Michael Nagler, Ser. No. 459,230, filed Jan. 19, 1983, and assigned to the assignee of the present invention. This optical system provides diffraction limited focusing across a wide flat field (here 17½") and a uniform beam spot size of approximately 17 μm. A clock generator 20 responsive to X axis reference signals provides a clock signal, so that incoming data applied to a register 22 may be clocked out at times related to beam position so as to precisely position the pixels. Driver amplifiers for the modulator 16 have been omitted for simplicity and brevity, as have specific details of the optical system which are conventional and immaterial to the inventive concepts. The film F is advanced in the Y direction by a carriage (not shown) which can move continuously or incrementally and it will be understood that the entire system is enclosed within a light tight housing if film sensitive to visible light is employed.

A reference beam assembly includes a conventional beam splitter 24 disposed between the laser 14 and the modulator 16 for deflecting a minor proportion (e.g., 10%) of the principal beam in a perpendicular direction. This reference beam 25 is successively reflected off a pair of angled mirrors 26, 27 so as to bypass the modulator 16 and then be returned toward the principal beam path. In the bypass path, however, the reference beam is rotated 90° in polarization by a rotator 29. Upon return to the principal beam path the reference beam is returned to collinearity by a beam recombiner 30.

An acousto-optic beam deflecting device 32 is disposed subsequent to the beam recombiner 30 to adjust the height (Y-direction) of the beam as pixels are being written on film F. Y-axis control signals derived as described below control the device 32. (In a scanning system in which the object document is being read for data, the principal beam is not modulated and reflected light must be detected, but the clocking and servoing schemes are fundamentally alike.) Both orthogonally polarized beams are equally deflected in the X-axis direction by the device 32.

A polarized beam splitter 33 responsive to the polarization of the reference beam, slightly deflects the reference beam 25 from the principal beam 12 following the beam deflector 32. A pair of training mirrors 34, 35 in the path of the reference beam redirect it into a path of very slight divergence relative to the principal beam, with the beams crossing at an intermediate pupil transfer or imaging device 36. Although the beams diverge at a small angle they may still be referred to as substantially parallel because they have a very small spacing after traveling. Both beams enter the flat field optical system 19 via a pair of beam folding mirrors 17, 17' and a scanning polygon 18 and subsequently are directed downwardly (as seen in FIG. 1) toward the scan line along film F.

The scanning principal beam 12 impinges on the flat film F format, while the correspondingly scanning reference beam 25 only is deflected horizontally by an angled mirror 37 onto an optical reference scale 38 that is disposed substantially parallel to and adjacent the scan line on the film F. Varying opacity gradations (discussed below with respect to FIG. 2) on the reference scale 38 modulate the intensity of the reference beam 25 during scanning, and this is sensed by a photodetector 39 disposed behind the reference scale 38.

Figure 2:
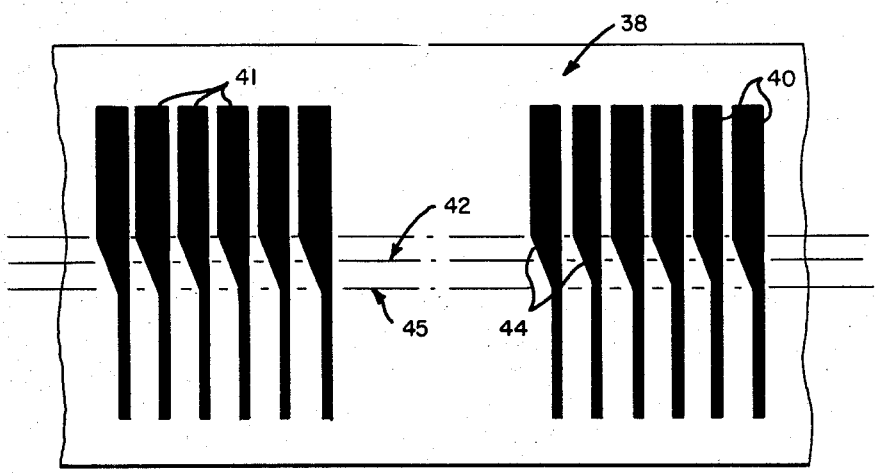
FIG. 2 is a diagrammatic, plan view showing a specific example of a reference scale according to the present invention.

Referring now to FIG. 2, the reference scale 38 modulates the reference beam as a function of both the scan line position along the X axis and the lateral deviation (Y axis error) in the main beam 12. More specifically, reference scale 38 includes regularly spaced and identical indicia forming spokes 40 of opaque or low transmissivity in contrast to a transparent or translucent background, and having two sets of geometrical properties. The first is a set of evenly spaced leading edges 41, which when scanned by the beam generate the leading edges of a series of pulses. These leading edges define a data clock exactly referenced to a position of the principal beam 12 in an X-direction of the format. The second geometrical property is a variation in spoke width, which varies as a function of beam position along the Y axis. Spoke width, which is shown as nonsymmetrical about a line 42 extending perpendicularly to and generally bisecting spokes 40, is defined as the distance between a leading edge 41, which can be considered a leading spoke edge, and an associated trailing edge 44. As can be seen, the spacing between a pair of edges 41, 44 is greater above line 42 than below same, with a linear transition being made in a zone 45. A reference scale 38 of about 17½" in length and having about 4400 pairs of edges 41, 44 has been found satisfactory.

The different widths between the edges 41 and 44 formed on the reference scale 38 cause signals to be generated by photodetector 39, as the length of the scale 38 is being scanned by the impinging reference beam 25. This signal is fed back in conventional servo circuits 50 (not shown in detail) to control the beam height deflecting device 32 to adjust the main beam 12 and reference beam 25 positions in the Y direction to seek the center line 42 on the reference scale 38. If the pulse width generated for a beam height position between edges 41 and 44 is less than a predetermined time interval, the deflector 32 is driven to raise beam 12. If, on the other hand, the beam position crosses edges 41 and 44 to provide a greater than nominal pulse width, the deflector 32 lowers the beams and thus the associated scan line.

An example of a beam height deflecting device 32 is an acousto-optic deflector driven by an adjustable radio frequency (RF) source. The driving source itself may be controlled by suitable known servo circuitry 50 as a function of signals received from the photodetector 39. The pulse width may, for example, be converted to a variable RF signal by signal integration or time duration counting techniques (together with D/A conversion) used to control a variable frequency oscillator.

Referring to FIG. 3 of the drawings, a flow diagram is shown setting forth the various elements making up a preferred apparatus for carrying out the present invention.

Starting with the light source, which can be a conventional continuous wave laser 110, preferably polarized, a beam is fed through coupling or training mirrors 112 to a conventional beam splitter 114. One portion of the split beam, referred to above as the main beam, is sent directly to an acousto-optical (A/O) modulator section 116 where the beam is modulated as it propagates onward to a beam recombiner 118. The auxiliary reference beam created by splitter 114 is fed to a training mirror 120, rotated 90° in a polarization direction by a rotator 122, and then trained by a second mirror 124 into the beam recombiner 118 to be superimposed with the main beam emitted from modulator 116. There now are in the system two collinear beams superimposed, one modulated and one not, and having orthogonal polarizations.

The recombined beams are now sent into an A/O height servo 126, preferably a glass block acoustically modulated by a lithium niobate piezoelectric crystal, which deflects the superimposed beams up or down in response to beam positional error. They then pass to a polarizing beam splitter 128, which sends one beam directly to a pupil imaging device 132 and the other beam through the same device 132 via a first training mirror 130 which is positioned to offset the reference beam at a small angle relative to the principal beam. A second training mirror 134, after the pupil imaging device 132 is used in establishing the desired small angle of divergence between the beams as they enter an imaging and deflecting system 136, directs the main beam so as to scan a suitable flat format F. The modulated reference beam impinges on a beam folding mirror 137 and is reflected to a reference scale 138 constructed in the manner of reference scale 38 in FIG. 2. The output of a photodetector 139 behind the reference scale 138 is fed to a data clock synchronizer 140 which provides synchronizing signals to data clock circuits 142 operating at a basic multiple of the reference indicia rate so as to multiply the number of image pixels accordingly. The data clock is input to a data-in storage register 144 that controls operation of the principal beam modulator section 116 through a conventional driver 146.

The output from the photodetector, which will be in the form of pulses detected by photomultiplier circuits feeding an amplifier, is also fed to height error signal circuits 148 which times the distance between the on and off going spoke edges on the reference scale, as described above, and controls position of the acousto-optic height servo 126 through a suitable RF driver 150.

As can be readily understood from the above description and from the drawings, the present invention provides in a simple and economical manner a pair of feedback loops, one for the X-direction of a flat format and the other for the Y-direction thereof, which assures precise locating of pixels on any desired format. Further, the arrangement can be employed with either printing or scanning as desired. The use of a single reference beam to correct location errors in both the X and Y directions simplifies construction of the apparatus, in that scan line position and parallelism are assured with lower cost optics than would otherwise be needed. In addition the system assures close control of position in both directions, although it is to be understood that the Y-direction loop can be used alone, or in conjunction with any other kind of pixel clock.

While different alternatives and modifications have been suggested, it will be appreciated that the invention is not limited thereto but encompasses all forms and variations falling within the scope of the appended claims.

What is claimed is:

1. A system for controlling scanning of a light beam along a scan line at an object plane comprising:
   means providing a principal light beam;
   means responsive to the light beam for establishing a substantially parallel reference beam;
   electrically controllable single axis beam adjustment means in the path of the principal and reference beams;
   an optical system in the path of the principal and reference beams for scanning the principal beam along the scan line and the reference beam adjacent thereto; and
   means including reference scale means responsive to reference beam position in two dimensions for providing (1) a clocking signal to identify beam position along the scan line and (2) a beam position signal representing beam position in a direction orthogonal to the scan line on the object plane, the latter signal being coupled to control the beam adjustment means.

2. The invention as set forth in claim 1 above, wherein the reference scale means comprises an elongated member disposed along the scan line and having a plurality of spokes of varying transmissivity relative to the remainder of the reference scale, the spokes defining geometrical patterns which vary in two orthogonal dimensions and wherein the means responsive to reference beam position further comprises means disposed along the reference scale for detecting light variations in the reference beam passing therethrough.

3. The invention as set forth in claim 2 above, wherein the system provides an unmodulated principal beam along the scan line.

4. The invention as set forth in claim 2 above, wherein the system further includes light beam modulator means disposed in the path of the principal beam prior to the beam adjustment means, and means responsive to the clocking signal for controlling the timing of modulation of the principal beam, and wherein the means for establishing a reference beam includes optical means for bypassing the modulator means with the reference beam.

5. The invention as set forth in claim 4 above, wherein principal beam has an initial polarization and the means for bypassing the modulator means includes means for providing a different polarization of the reference beam relative to the principal beam, and means responsive to the direction of polarization for introducing a small spatial divergence between the beams.

6. The invention as set forth in claim 2 above, wherein the spokes of the reference scale means comprise a plurality of regularly spaced similar elements each having terminal portions of substantially constant width that are different at each terminal portion and an intermediate portion of varying width, and with one straightsided edge thereon.

7. A system for controlling the scanning of a beam of light across an associated surface comprising:
 (a) a light beam source;
 (b) means for providing a reference beam adjacent to the light beam source;
 (c) scanning means for directing the light beam and the reference beam across an associated surface in a predetermined linear scanning direction;
 (d) beam deflecting means in the path of the light beam and the reference beam prior to the scanning means for adjusting beam direction in a direction orthogonal to the scanning direction; and
 (e) reference means disposed adjacent the associated surface and comprising means responsive to reference beam position orthogonal to the scanning direction for controlling the beam deflecting means and means for providing a signal which varies in accordance with regular increments of movement of the beam along the scanning direction, to enable precise identification of pixel location two orthogonal directions.

8. The invention as set forth in claim 7 above, wherein the reference means comprises a reference scale in the form of an elongated member having indicia defining a plurality of spokes having two sets of properties, the first of the two sets of properties being in evenly spaced first set of edges for generating a data clock reference to the position of a first of two separate, orthogonal directions corresponding to the scan line direction, and a second set of edges each of which is spaced variably from an associated one of the first set of edges and providing variable width of each of the spokes along a given region.

9. The invention as set forth in claim 8 above, wherein the spokes have one maximum width portion adjacent one end thereof, a minimum width portion adjacent another end thereof, and an intermediate portion of linearly varying slope therebetween, the nominal position of the beam being along the center line perpendicular to the spokes and dividing the varying width portion of the spokes.

10. The invention as set forth in claim 9 above, wherein the beam height deflecting means comprises an acousto-optical deflector and driver means therefor, and wherein the system is a system for writing information and further includes beam intensity modulator means disposed in the path of the principal light beam prior to the scanning means and responsive to clocking signals derived from the reference scale means.

11. The invention as set forth in claim 10, wherein the elongated member has spokes at a density of in excess of 200 per inch, and wherein said system further comprises means responsive to the signal from the reference means for generating a higher frequency clock which is synchronized by the regular variations of the reference scale induced on the reference beam, whereby a higher pixel density is achieved.

12. A system for controlling scanning of a light beam along a scan line at an object plane comprising:
 means providing a light beam;
 means disposed along the light beam path for splitting off a reference beam substantially parallel to and spaced apart from the principal beam;
 an optical system for scanning the principal beam along the scan line and the reference beam adjacent thereto;
 electrically controllable single axis beam adjustment means in the path of the principal and reference beams before the optical system, the single axis being orthogonal to the scan line direction; and
 means including reference scale means disposed along the scan line adjacent the object plane and responsive only to reference beam position, for providing clocking signals to identify the position of the principal beam along the scan line and control signals that are coupled to the beam adjustment means to adjust beam position along the single axis.

13. The invention as set forth in claim 12 above, wherein the beam adjustment means provides an adjustment of the beam in the direction orthogonal to the scanning direction, and wherein the reference scale means comprises a plurality of regularly spaced indicia providing geometrical patterns which vary in two orthogonal directions, and further comprises means for detecting variations in the reference beam introduced by the reference scale.

14. The invention as set forth in claim 13 above, wherein the reference scale means comprises a plurality of identical spoke indicia having regularly spaced edges relative to the direction of scan of the reference beam, and widths which vary across at least a predetermined range about a mid-point of the spokes, such that the scanning reference beam is modulated to provide a pulse sequence with pulse transitions marked by the regularly spaced edges of the spokes and other pulse transitions being of variable duration dependent upon the position of the beam along the length of the spokes, such that the pulse sequence provides positional information as to two orthogonal directions.

15. The invention as set forth in claim 14 above, wherein the scan line comprises an X direction and the beam adjustment means provides a Y axis adjustment orthogonal thereto, wherein the reference scale comprises spokes of different transmissivity than the background therefor, and wherein said system further includes means for modulating the principal beam prior to the optical system and optical means for bypassing the reference beam around the modulation means, said optical means including beam training means for introducing a very slight angular divergence between the reference beam and the principal beam.

16. The invention as set forth in claim 15 above, wherein the system principal beam has an initial polarization and the further comprises means in the bypass path of the reference beam for rotating the plane of polarization of the reference beam for rotating the plane of polarization of the reference beam 90° relative to the principal beam, and wherein said means for inducing a slight angular divergence comprises means responsive to the polarization of the reference beam for deflecting the reference beam only and training mirror means in the path of the deflected reference beam for establishing the desired angle of divergence between the reference beam and principal beam.

17. The invention as set forth in claim 16 above, wherein the system comprises means including register means for supplying input data to control the modulation means, and clocking circuit means responsive to the clocking signals for controlling reading data out of the register means to control the modulation means in accordance with instantaneous beam position along the scan line.

18. The invention as set forth in claim 17 above, wherein the clocking means provides clocking pulses at a higher rate than the clocking signals provided from the means including reference scale means.

19. A reference scale for use with a system for controlling a beam of light in two separate, mutually orthogonal directions, comprising:
an elongated member having a plurality of spokes of different light transmissive or reflective properties relative to the background therefor, and each spoke having two sets of geometrical properties, one comprising a plurality of evenly spaced edges for providing positional references for the reference beam along a scan line direction, and a second set of edges having at least one portion that is not parallel to the first set of edges and provides varying width spoke in accordance with a range of deviations of the beam in a direction orthogonal to the scan line direction.

20. The invention as set forth in claim 19 above, wherein the spokes have one end of substantially even width and an opposite end of substantially even but smaller width and a linear edge on one side and a linear transition edge between the ends of different width on the other side, the transition edge being symmetrical about a center line that is substantially normal to the linear edge of the spokes.

21. A method of providing precise information as to the position of a scanning light beam, comprising the steps of:
(a) generating a beam of light;
(b) splitting the generated beam of light into a principal beam and a reference beam;
(c) scanning the principal and reference beams in adjacent relation relative to a scan line on a format;
(d) sensing positional deviations in the reference beam only in two orthogonal directions relative to the scan line, including sensing the position of the reference beam along the scan line to provide a data clock for identifying actual beam position; and
(e) modifying the position of the principal beam in a direction orthogonal to the scan line in accordance with the sensed variation.

22. The method as set forth in claim 21 above, wherein the step of generating a beam of light comprises generating a beam of light of a given initial polarization, and further including the steps of modifying the polarization angle of the reference beam relative to the principal beam, and using the difference in polarization to establish a predetermined separation between the principal and reference beams adjacent the scan line.

* * * * *